US011853975B1

(12) United States Patent
Leblang et al.

(10) Patent No.: US 11,853,975 B1
(45) Date of Patent: Dec. 26, 2023

(54) CONTEXTUAL PARSING OF MEETING INFORMATION

(71) Applicant: Amazon Technologies, Inc., Seattle, WA (US)

(72) Inventors: Jonathan Alan Leblang, Menlo Park, CA (US); Milo Oostergo, Issaquah, WA (US); Kevin Crews, Seattle, WA (US); Collin Charles Davis, Seattle, WA (US); Yu-Hsiang Cheng, Bothell, WA (US); Aakarsh Nair, Redmond, WA (US); Richard Christopher Green, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 664 days.

(21) Appl. No.: 15/839,757

(22) Filed: Dec. 12, 2017

(51) Int. Cl.
*G06Q 10/00* (2023.01)
*G06Q 10/1093* (2023.01)
*H04L 12/18* (2006.01)
*G10L 13/08* (2013.01)
*G10L 15/22* (2006.01)
*G06F 16/93* (2019.01)
*G06F 16/245* (2019.01)
*G06F 40/205* (2020.01)
*G06F 3/16* (2006.01)

(52) U.S. Cl.
CPC ....... *G06Q 10/1095* (2013.01); *G06F 16/245* (2019.01); *G06F 16/93* (2019.01); *G06F 40/205* (2020.01); *G10L 13/08* (2013.01); *G10L 15/22* (2013.01); *H04L 12/1818* (2013.01); *G06F 3/16* (2013.01)

(58) Field of Classification Search
None
See application file for complete search history.

(56) References Cited

U.S. PATENT DOCUMENTS

| 1,072,683 | A  | * | 9/1913 | Wilson | F16J 9/20 |
| | | | | | 277/461 |
| 9,646,611 | B2 | * | 5/2017 | Vogel | G06F 3/167 |
| 10,102,855 | B1 | * | 10/2018 | Sindhwani | G06F 40/134 |
| 10,761,866 | B2 | * | 9/2020 | Liu | G06F 16/338 |
| 2012/0191500 | A1 | * | 7/2012 | Byrnes | G06Q 10/1095 |
| | | | | | 705/7.19 |
| 2012/0269333 | A1 | | 10/2012 | Goguen et al. | |

(Continued)

OTHER PUBLICATIONS

How Cloud Computing Has Transformed Businesses and Made them Mobile, Shah, Hardick, Spiceworks (Year: 2022).*

(Continued)

*Primary Examiner* — Hafiz A Kassim
*Assistant Examiner* — Scott M Ross
(74) *Attorney, Agent, or Firm* — Knobbe, Martens, Olson & Bear, LLP

(57) ABSTRACT

Systems and methods are disclosed related to determining and providing contextual information associated with a meeting based in part by parsing text from a meeting invitation or calendar entry. A voice-capturing device may receive audio data before or during a meeting that includes an invocation phrase used to invoke a voice-based functionality. A response may be generated by the voice-capturing device or an associated service provider system based on the contextual information determined from the parsed meeting invitation and/or related sources.

19 Claims, 4 Drawing Sheets

(56) References Cited

U.S. PATENT DOCUMENTS

| | | | |
|---|---|---|---|
| 2013/0218982 A1 | 8/2013 | Hymel et al. | |
| 2015/0169284 A1* | 6/2015 | Quast | G06F 16/9535 |
| | | | 704/275 |
| 2015/0373183 A1* | 12/2015 | Woolsey | H04M 1/72448 |
| | | | 348/14.08 |
| 2017/0006162 A1 | 1/2017 | Bargetzi et al. | |
| 2018/0012601 A1* | 1/2018 | Kumar | G10L 15/22 |
| 2019/0057698 A1* | 2/2019 | Raanani | H04M 3/22 |
| 2019/0132265 A1* | 5/2019 | Nowak-Przygodzki | |
| | | | G06F 3/167 |
| 2019/0172017 A1 | 6/2019 | Burlin et al. | |
| 2019/0206405 A1* | 7/2019 | Gillespie | G06Q 30/0201 |

OTHER PUBLICATIONS

Amazon, 'Understanding Custom Skills,' https://web.archive.org/web/20171208024950/https:/dev zon. com/docs/custom-skills/understanding-custom-skills.html, accessed on Dec. 8, 2017.

Amazon, 'Use the Skill Builder (Beta) to Define Intents, Slots, and Dialogs.' https://web.archive.org/web20171208025116/https:/developer.amazon.com/docs/custom-skills/use-skill-builder-beta-to-define-intents-slots-and-dialogs.html, accessed on Dec. 8, 2017.

Miller, Ron, 'Cisco Spark Assistant bringing voice commands to meeting hardware,' https://techcrunch.com/2017/11/02/cisco-is-bringing-voice-commanands-to-spark-meeting-hardware/, dated Nov. 2, 2017.

Mobileday, 'The Fast, Reliable Way to Dial Into Any Call On Any Platform, From Any Location,' hhttps://mobileday.com/, accessed on Nov. 9, 2017.

Priest, David, 'The only way to save the smart hub is to kill it,' https://www.cnet.com/news/the-only-way-to-save-the-smart-home-hub-is-to-kill-it/, dated May 1, 2017.

Zeisi, 'Amazon Alexa—Part 1, Intents and Utternaces,' https://www.pmandcode.com/amazon-alexa-part-1-intents-and-utterances/, dated Feb. 21, 2017.

* cited by examiner

CONTEXTUAL PARSING OF MEETING INFORMATION

BACKGROUND

A distributed system may provide remote clients with access to various services that are implemented largely within the distributed system and that are accessible via a network (which may be considered cloud-based services). The types of devices that can access cloud-based services continue to expand and diversify, including desktop computing devices, mobile devices such as smartphones and tablets, voice-capturing devices, home automation devices, and various other types of network-capable devices that are part of the "Internet of Things" (IoT). By accessing cloud-based services, a diverse universe of devices may access additional functionality or computing power not available locally on the devices. Some devices that access cloud-based services may provide virtual assistant functionality, such as by responding to spoken voice commands from a user.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of at least some embodiments of the present disclosure relate to providing automated voice-based assistance in association with a meeting, such as a teleconference, videoconference, or in-person meeting between two or more attendees. The voice-based assistance may include providing computer-generated speech output in response to spoken questions or commands from a user before or during a meeting, where the responsive information may be based at least in part on contextual meeting information parsed from one or more calendar items (e.g., meeting invitations) and/or messages (e.g., emails) associated with the meeting.

For example, in one embodiment, a user may ask a virtual assistant device (sometimes referred to herein as a "VA device") a question such as "What is the agenda for this meeting?" The VA device may send the captured audio data or an indication of the question to a network-based service provider system. In response, the service provider system may generate a response for delivery to the VA device for audible presentation to the user. In this example instance, the response may be generated based in part on the results of the service provider system parsing text data retrieved from a meeting invitation for the meeting to identify agenda items using keywords, a template, machine learning models, and/or other methods that will be described herein.

As another example, the contextual information parsed from a meeting invitation and optionally from related emails or other messages may enable a voice-capturing device, for instance, to respond to spoken requests that are unclear without context, such as "Open the file to be discussed." In some embodiments, given the contextual meeting information determined by a service provider system from meeting invitations and/or emails, the system may infer the specific file that a user intends to refer to despite the user using a vague reference or pronoun (e.g. simply referring to "the" file). Accordingly, aspects of the present disclosure enable a voice-based assistant device or other device to respond to user requests in a manner that is more accurate with respect to the user's intent and/or to which the device would be unable to properly respond without contextual meeting information determined as described herein.

Figure 1A:
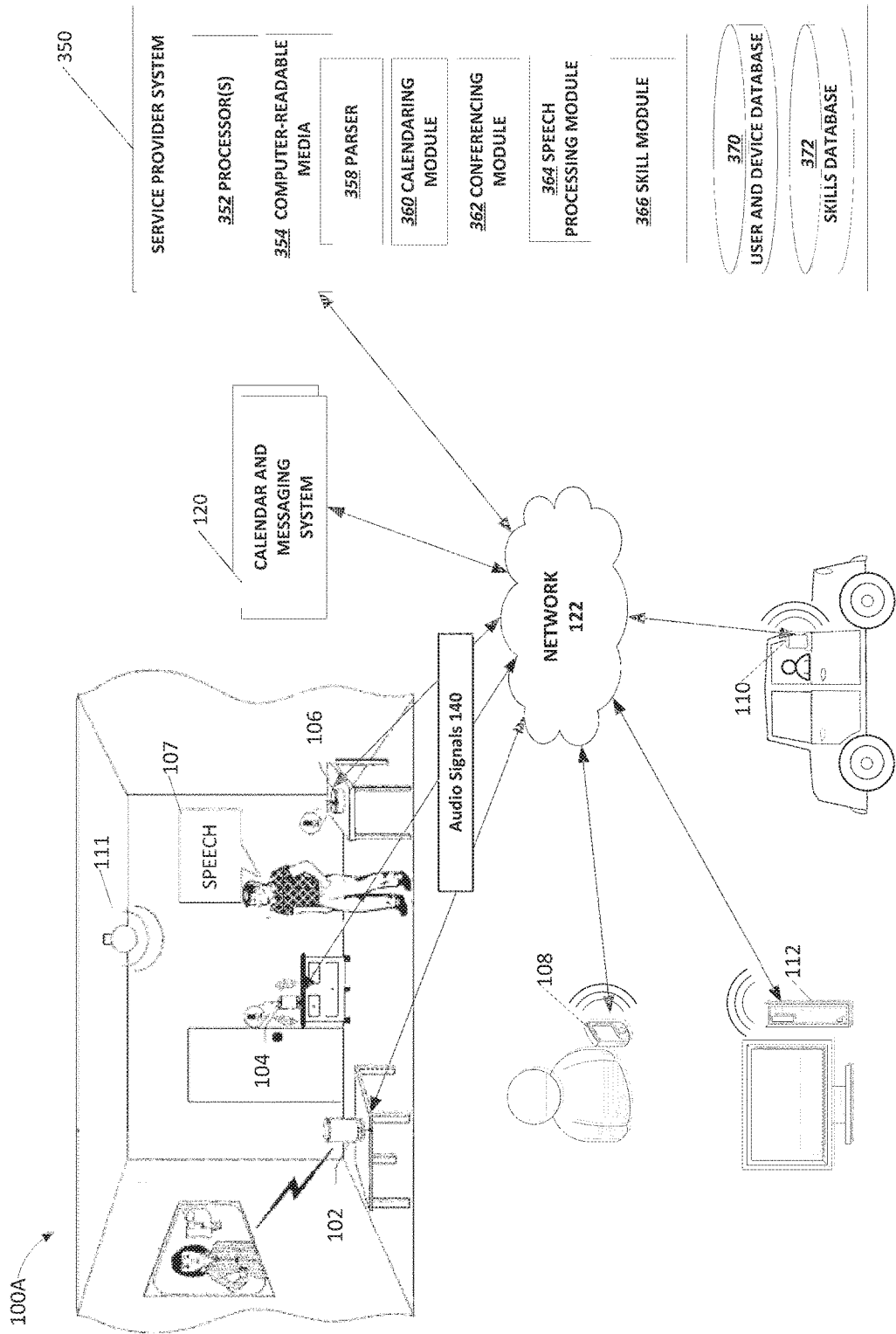
FIG. 1A illustrates an example networked environment in which various virtual assistant devices and a service provider system may be implemented, according to some embodiments.

FIG. 1A illustrates an example networked environment 100A in which various VA devices 102, 104, 106, 108, 110, and 112, and a service provider system 350 may be implemented, according to some embodiments. VA devices may provide a user with a wide variety of services including weather, remote controlling of music or movie applications, hands free navigation, and/or other features depending on the location and context. Generally, each of these devices may be controlled by a user through the device's recognition of voice commands spoken by the user. The devices receive commands and may parse the commands internally or transfer the commands to an external computing system, such as the service provider system 350 or other network-based system or service, for processing. While an external processing system other than the service provider system 350 (such as a server or service that processes and responds to voice commands from a number of different VA devices over the network 122) is not illustrated in FIG. 1A, the service provider system 350 may be part of or otherwise associated with such a system or may provide such functionality itself.

VA devices are expanding their numbers and reach. The devices may be located in various places, including at a user's home (such as VA devices 102, 104 and 106), integrated within a mobile phone or tablet device 108, in a car (such as VA device 110), at an office (such as desktop computer or workstation VA device 112), or in a hotel room, integrated in a wearable device such as a smart watch (not shown), and/or other locations. Other suitable devices may include desktop and laptop computing devices, smartphones, tablets, voice-capturing devices such as smart speakers, smart appliances, and/or other "Internet of Things" (IoT) devices. Functionalities or skills may be offered to devices by a cloud-based service provider environment to implement particular tasks requested by the devices. A device may be associated with a user's account and/or a device-specific account in the service provider environment, which may be maintained by the service provider system 350.

One or more of the VA devices may include voice-capturing devices and/or "smart speakers" that are configurable to stream or send voice input to the network-accessible voice-based service provided by a service provider environment. In response, the voice-based service(s) may take one or more actions, such as invoking one or more of the skills or functionalities, and/or stream voice output back to the originating device for playback on that device. The actions and/or voice output may vary based on the skills of the service provider environment that are enabled for the particular device.

Skills or functionalities that are responsive to voice input from VA devices may be referred to as voice-enabled skills or voice-enabled functionalities. In various embodiments, the skills provided by the service provider environment may include, for example, scheduling conference calls; identifying a speaker during a conference call; providing meeting agenda information; announcing the participants in a meeting; acting as a scheduling assistant; providing calendaring services; recording a meeting; accessing calendars, phone directories, or e-mail; creating, scheduling, and/or modifying tasks; retrieving and displaying documents; and/or many others. In one embodiment, some of the VA devices may be satellite devices that are configured to connect to a central device over a local area network, and the central device may then connect to the service provider environment. By accessing cloud-based services of the service provider environment, the devices may access additional functionalities or other resources not available locally on the devices.

In some embodiments, individual skills or functionalities may be associated in the service provider system with an "intent" that may represent an action that fulfills a user's spoken request, and may have an associated code module to be executed by the service provider system. Intents can optionally have arguments, which may be referred to as "slots" in some embodiments. For example, a skill for planning a trip might define an intent named PlanMyTrip that has slots named fromCity, toCity, and travelDate. A user can then speak a command such as "Ask the Plan My Trip service to plan a trip from Seattle to Portland on Friday." Once the request is received and parsed, the service provider system 350 may then call a code module or service associated with the PlanMyTrip intent with the value "Seattle" in the fromCity slot, "Portland" in the toCity slot and the date for the next upcoming Friday in the travelDate slot. The service provider system can then save this information and provide responsive text to convert to speech for audible presentation to the user.

Slots or arguments for a skill or functionality may be defined with different types (which may be considered slot types or argument types). The travelDate slot in the above example may use a Date type to convert words that indicate dates (such as "today" and "next Friday") into a date format, while both fromCity and toCity may use a US_City type. If the above skill were extended to ask the user what activities they plan to do on the trip, other custom slot types may be defined and used, such as a List_Of_Activities slot type to reference a list of activities such as "hiking", "shopping", "skiing", and so on.

As illustrated with VA devices 102, 104 and 106, more than one VA device may be located in a same defined space, such as a room in a home or office, to provide additional coverage. Virtual assistant functionality may be associated with dedicated hardware (such as illustrated with at least standalone VA devices 102, 104 and 106), or may be implemented within a software application sharing processing power and storage with other applications in a computing system. A mobile phone or tablet device 108, for instance, may operate a virtual assistant application, or such functionality may be provided by or integrated with an operating system of the device 108.

The various VA devices may have one or more sensing mechanisms (or more broadly, data collection mechanisms) to collect data associated with a user, a user's activity, or a user's interaction with the VA devices. For example, a VA device equipped with a camera may detect a user's activity as the user walks past the VA device. On the other hand, when the VA device does not detect such user movement for some extended time, the VA device may be considered to have detected a user's inactivity with respect to that device. Various types of sensing mechanisms and related components will further be described with respect to FIG. 3. The sensing or presence detection components and determinations may be used, for example, to direct notifications and other audible or visual presentation to one or more VA devices that are most likely to be close to the user at the given time (e.g., to present a meeting notification at a VA device in the user's living room when he is in his living room, rather than presenting a notification at his office miles away).

In the illustrated embodiment of FIG. 1A, the VA devices can communicate with a service provider system 350 over a network 122. The VA devices may inform the service provider system 350 regarding sensed or captured user activities or interactions, as well as captured audio data to be parsed for potential skill invoking phrases. As will be disclosed further below, the sensed user activities or interactions may be of various types and have various associated data types. For example, an activity detected in association with a camera-equipped VA device may be associated with an image or a video file. As another example, a GPS-equipped mobile VA device may send GPS coordinates to the service provider system 350.

In some embodiments, a given VA device may collect audio signals, such as audio signals 140, via a microphone. The audio signals may include any sounds that a user may cause, both verbal and non-verbal. Verbal audio signals may be user utterances (such as user utterance 107), including voice commands directed to the VA device or speech directed to another person. The audio signals may be raw audio signals or processed audio signals. Such processing may include, for instance, increasing fidelity or otherwise cleaning up a recorded audio signal before applying speech recognition or other further analysis of the recorded audio.

In some embodiments, audio processing may also include identifying metadata associated with the audio signals (such as identifying the speaker or identifying a type of sound). The metadata may be transmitted in association with the audio signals 140 to the network 122. In some embodiments, as noted, the VA device may parse and otherwise process the audio signals 140, then transmit only the extracted content and metadata to the service provider system 350. In other embodiments, the service provider system 350 or some other third party hardware or service may perform the parsing and other analysis of an audio recording.

The service provider system 350 may include one or more processors 352 and computer-readable media 354. The service provider system 350 may also include one or more internal or external databases containing data about various VA devices and user profiles or accounts (such as user and device database 370). As one may readily appreciate, devices and users identified in the database 370 may be associated to indicate that a certain user owns or, alternatively, has access to a particular VA device. The association may be one-to-none, one-to-one, one-to-many, or many-to-many. Such associations may be permanent or temporary. For instance, a living room VA device is likely to have a permanent association with a user (such as the homeowner), while a hotel room VA device may no longer be associated with a particular hotel guest once the guest checks out of the hotel.

Some VA devices, such as VA devices 102, 104 and 106, may be configured to communicate locally with other devices of various types that are near the given VA device, such as in the same room, home or office. Various communication protocols or techniques may be employed for such communication, such as communicating via a local network (such as by the VA device and another local device both being connected to the same wireless network) or by a more direct device-to-device communication protocol (such as by establishing a Bluetooth connection). Such devices may include various controllable equipment such as a light 111, a television or other display monitor, a projector, blinds or other controllable window shades, heating and air conditioning thermostats, and/or many others.

In some embodiments, a VA device, such as VA device 106 may implement a discovery process to identify controllable devices that the given VA device can communicate with, such as by searching for such devices on a local network or searching for signals broadcast by the devices. Once a device, such as a network-connected light 111, is discovered by the VA device 106, for instance, the VA device 106 may store device information associated with the light 111 in a local data store of the VA device 106 and/or may send such information to the service provider system 350 to be stored in association with the VA device 106 (such as information identifying light 111 as a local device controllable by the VA device 106).

The computer-readable media 354 may include various software or hardware modules that perform various methods described herein. In the illustrated embodiment, the modules include parser 358, calendaring module 360, conferencing module 362, speech processing module 364, and skill module 366. The parser 358 may parse text data from calendars, emails or other sources to determine contextual information associated with a meeting. The calendaring module may maintain or access electronic calendars for users, including creating reminder notifications or other new calendar entries. The conferencing module 362 may assist users in joining conference calls, videoconferences or other meetings, and may act as a conference call hosting service in some embodiments. The skill module 366 may implement various skills or functionalities, such as in response to an associated invoking phrase or command detected in recorded audio data (such as by the speech processing module). Each of these modules will be described in more detail below.

The service provider system 350 may be in network communication with one or more calendar and/or messaging systems or services, such as calendar and messaging system 120. The calendar and messaging system 120, in some embodiments, may be a third-party system or service that is operated by an entity other than the operator of the service provider system 350. For example, the calendar and messaging system 120 may be associated with an email service that maintains personal and/or business emails accounts and electronic calendars for a large number of users and organizations. Additionally or alternatively, the calendar and messaging system 120 may be associated with a messaging service that enables its users to send instant messages, text messages, or other electronic messages to each other. As one example, the calendar and messaging system 120 may provide text-based messaging services between employees within an organization, such as via an internal corporate network or intranet. The service provider system 350 may request or retrieve a given user's calendar or messages from the calendar and messaging system 120, for instance, by initiating an automated login process using a user's account credentials for the associated email or calendar service, which the user may have previously provided to an operator of the service provider system 350 and approved of using for purposes described herein. In some embodiments, the service provider system 350 may utilize an application programming interface (API) offered by the calendar and messaging system 120.

Figure 1B:
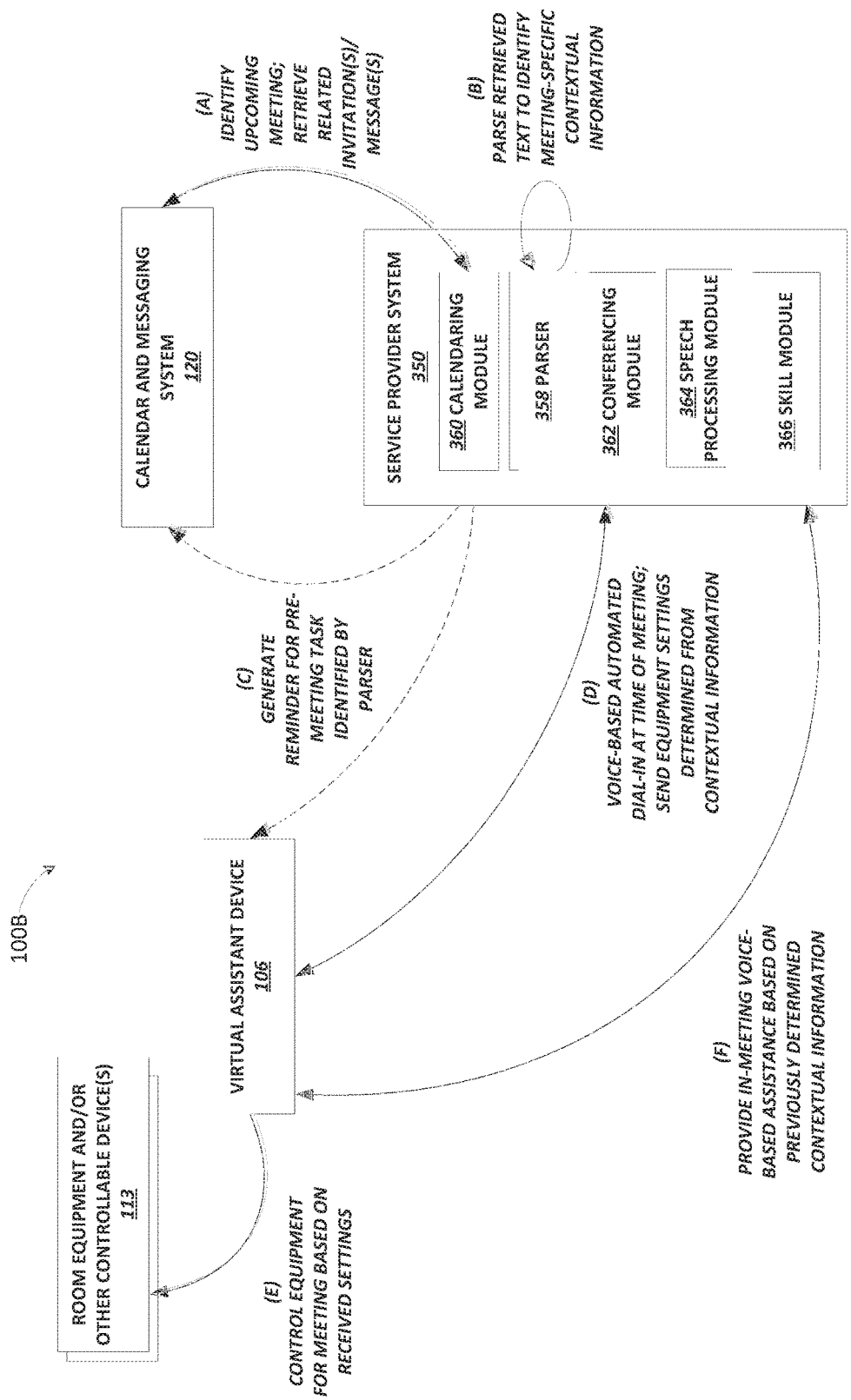
FIG. 1B is a flow diagram depicting an illustrative generation and flow of meeting-related data within a networked environment, according to some embodiments.

FIG. 1B is a flow diagram depicting an illustrative generation and flow of meeting-related data within a networked environment 100B, according to some embodiments. The illustrative flow begins with (A) the calendaring module 360 of the service provider system 350 identifying an upcoming meeting for a given user from the calendar and messaging system 120. As mentioned above, the calendaring module 360 may utilize an API provided in association with the calendar and messaging system 120 and/or may provide the user's login credentials in order to access the requested data. In some embodiments, the calendaring module 360 may periodically check for new calendar entries for the user, while in other embodiments the calendar and messaging system may utilize a push model to maintain up-to-date meeting information within the service provider system 350.

For a given meeting identified on the user's calendar, or for a given meeting notification identified in the user's email, the calendaring module may also search for and retrieve related meeting entries and/or messages from the calendar and messaging system 120. For example, the calendaring module may search for any email or meeting notification with a matching or similar subject line as the subject line of the meeting entry (e.g., may search for the phrase "Quarterly profit results" in the subject line of emails when the calendaring module identifies a calendar entry titled "Teleconference: Quarterly profit results"). Additionally or alternatively, the calendaring module may search for relevant archived messages of other types, such as text messages or user-to-user text-based conversations archived from an instant messaging or corporate intranet messaging application or service. In some embodiments, the calendaring module may also retrieve other calendar entries for related meetings (e.g., meetings with a similar subject line and/or having a similar participant list). The calendaring module may further retrieve meeting invitations or calendar entries for the same meeting from one or more of the other meeting participants' calendars, provided that the other users have provided approval for such retrieval. This may be beneficial for contextual parsing, for example, where one participant has additional information in the body of his individual meeting entry or notification (such as notes added by that participant, or conference call dial-in information from a host that was not distributed to all calendars or participants).

Next, the parser 358 of the service provider system 350 may (B) parse text of the meeting notification or calendar entry (and other emails, messages or entries retrieved above) to identify contextual meeting information specific to the given meeting. The parser 358 may generally be trained, programmed, or otherwise configured to identify and extract, from input text data, meeting information relevant to one or more meeting-related skills or functionalities that may later be invoked by a user. Accordingly, the parser may utilize multiple parsing techniques and/or models that may each be dependent on the specific functionality for which they are intended to identify relevant text data. For example, searches for certain key-value pairs may be employed by the parser to identify one set of information associated with a first functionality, while a neural network or other machine learning model may be used by the parser to identify a second set of information associated with a second functionality. Methods implemented by the parser 358 will be described in more detail below with respect to FIG. 2.

Once contextual meeting information has been determined and stored by the service provider system 350, and optionally associated with specific functionalities and associated intents, the service provider system 350 may optionally (C) generate one or more reminders for pre-meeting tasks to be performed, to the extent that any such tasks were identified by the parser 358. For example, the parser 358 may be configured to identify the occurrence of certain temporal keywords or phrases (such as "before the call" or "in preparation") in proximity with at least part of a participant's name (e.g., "John" appearing in the phrase "John will distribute the spreadsheet before the call"). Alternatively or additionally, the parser may determine that the body of a meeting notification mentions a filename or document to be discussed during the meeting, yet the given file does not appear as an attachment to the meeting invitation or related emails.

If the parsing results indicate that an action item or task appears to need to be completed by a participant or other individual before the meeting, the service provider system 350 may generate an appropriate reminder for the given individual (or multiple individuals, such as if the responsible party cannot be determined by the parser from the input data), which may be added to the individual's calendar via the calendar and messaging system 120 and/or presented visually or audibly via a VA device 106 at some point before the meeting. The time of the reminder notification or calendar entry may be determined by the service provider system 350 based on timing information identified in association with the task in the input text data and/or a default amount of time before the meeting is scheduled (e.g., the day before).

At or near the time of the scheduled meeting (such as two minutes before, five minutes before, or another amount of time), the service provider system 350 may (D) send instructions to the VA device 106 to notify the user of the meeting and request if the user would like the VA device 106 to connect to the meeting, such as by phone or video. The specific VA device to provide the notification to the user may be determined by the service provider system 350, in some embodiments, based on sensing data recently recorded by the VA device 106 (e.g., motion, sound or interaction data) that indicates that the user is likely currently located in physical proximity to the given VA device. As an example, the VA device 106 may then audibly present a voice-based request to the user such as "Would you like to join the two o'clock team meeting call?" If the user replies affirmatively, the VA device 106 may use dial-in information (such as a phone number and associated passcode) or other connection information (such as a URL and login information) provided by the service provider system 350 (which may have been extracted from an associated meeting invitation by the parser) to connect to the meeting. The connection to a call or videoconference may be performed by the VA device itself, or may be in cooperation with additional devices or hardware that the VA device is in communication with, such as a phone, desktop computer, projector, etc.

In some embodiments, the service provider system 350 may additionally (D) send equipment settings information for the meeting determined based on the contextual meeting information determined above. For example, the service provider system 350 may indicate that video functionality should be used for the meeting based on device configurations of the other participants, may indicate to close remotely controlled window shades (such as based on a determination that the excessive light at the given time of day will lower visibility of a projector display), and/or other device configuration instructions. The VA device 106 may accordingly (E) control one or more other devices or pieces of equipment 113 in the room to effectuate the desired settings.

As the meeting is about to start or during the meeting, the VA device 106 and service provider system 350 may (F) provide additional contextual meeting assistance, either unprovoked or in response to specific invoking phrases spoken by the user. For example, the user may invoke a meeting agenda skill or functionality by speaking, in one embodiment, a phrase that includes the invoking word "agenda," such as the command "What is the agenda for this call?" In some embodiments, the phrase may be preceded by a general service-invoking word that signals when a phrase should be interpreted as an instruction or request to the VA device as opposed to a comment intended for human participants in the meeting. The request (either as audio data to be parsed by the service provider system or as text or tokens preprocessed by the VA device 106) may be sent by the VA device 106 to the service provider system 350 for processing by the speech processing module 364.

When the speech processing module identifies an invoking phrase for a given functionality in the received audio data, the skill module 366 may implement an associated code module (including passing into the code module any arguments, intents or input values spoken in the invoking command) to generate a response based on the contextual meeting information previously determined above. In other embodiments, the parsing of the meeting invitation may be performed in real time dynamically in response to the voice command in order to generate a response. The code module for a meeting agenda functionality may, for example, retrieve a list of topics, action items, documents and/or other items that the parser identified in the meeting invitation or determined based on related data associated with the meeting. The responsive data may then be organized or converted into a presentable format or phrasing by the associated code module and sent back to the VA device 106 for audible or visual presentation to the user.

Figure 2:
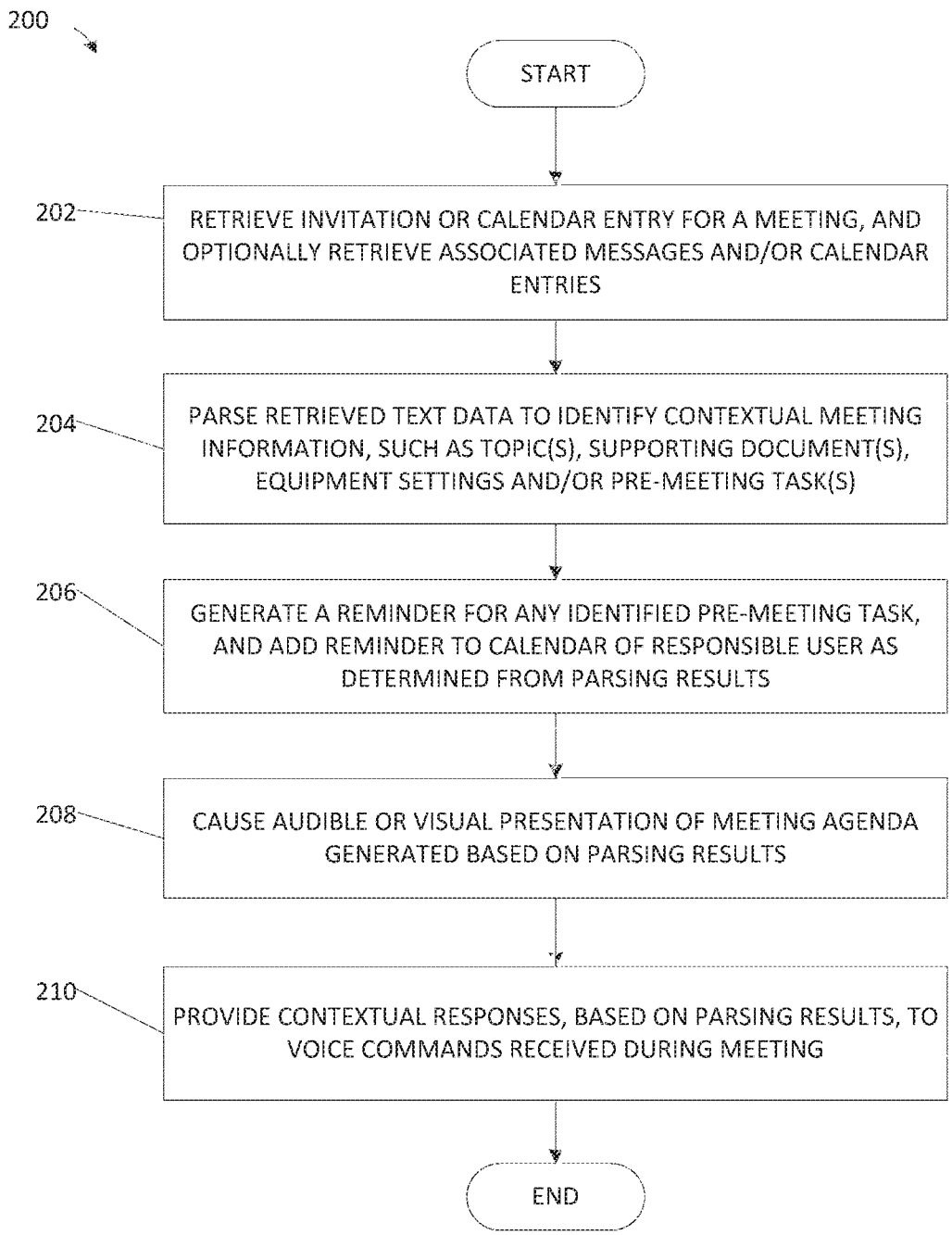
FIG. 2 is an illustrative flow diagram of a method for providing voice-based meeting assistance, including parsing meeting-related text data and determining associated contextual information, according to some embodiments.

FIG. 2 is an illustrative flow diagram of a method 200 for providing voice-based meeting assistance, including parsing meeting-related text data and determining associated contextual information, according to some embodiments. The illustrative method may be implemented by the service provider system 350. The method begins at block 202, where the service provider system 350 retrieves an invitation or calendar entry for a meeting, and optionally retrieves associated messages (such as emails) and/or calendar entries, as discussed above with respect to FIG. 1B. As discussed above, the emails or related calendar entries retrieved may be limited in scope (such as only those sharing the same or similar subject line as the meeting invitation and/or with the same recipients or participants as the meeting), and may only be retrieved in accordance with prior user approval via privacy settings or other preferences.

Next, at block 204, the parser 358 of the service provider system 350 may parse text data of the meeting notification and/or other information retrieved above to identify contextual meeting information, such as one or more topics, supporting documents, equipment settings, and/or pre-meeting tasks. In some embodiments, the parser may receive or retrieve the input text data (including some structured data, such as fields designated as "subject," "required attendees," "optional attendees," etc., as well as unstructured or free-form text that may appear in the body of a meeting invitation or email) and build a data structure giving a structural representation of the input. The data structure may include, in some embodiments, a parse tree, abstract syntax tree or other hierarchical structure.

In other embodiments, the parsing may not include generating any formal or structural representation of the input, but rather may identify and extract relevant portions of text from a larger input text set based on keywords, templates, rule sets, regular expressions, pattern matching or other techniques. In some embodiments, lexical analysis may precede the text parsing in order to create tokens from the sequence of input characters, and rule sets may then be applied to the tokens (e.g., finding a keyword token and extracting a certain number of subsequent tokens as relevant data). In some embodiments, one or more parsing models may be automatically or semi-automatically generated based on machine learning techniques. For example, a model may be trained to identify that sequences of numbers having a certain range of digits are likely to be dial-in passcodes for a given conference call system, and that this is more likely when the digits follow or precede certain keywords or characters. The parser 358 may alternatively or additionally access one or more templates in order to parse a given set of text and/or in order to format output (such as a meeting agenda generated from inputted meeting invitation text).

The parser 358 may have access to a number of predefined templates that provide the system with examples of how meeting invitations may be formatted and structured. Each template may identify, for example, a number of different potential patterns or portions of text that may appear in input text data, including words and punctuation, along with identification of variable fields that should be extracted and stored with a given variable name or field value. As a simplified example, a template may include a line (among other lines identifying potential structure or patterns expected in particular input data) such as "meeting at {meetingTime} PDT." This line may be interpreted by the parser 358 as an instruction that when the parser encounters a portion of input text data that includes the text "meeting at" followed soon after by the text "PDT", the parser should extract the text in between those strings as a value to store in association with the "meetingTime" label or variable name (such as to be used later as an argument or slot value for a given intent or code module associated with a given functionality, as discussed above).

Individual templates, in some embodiments, may be associated with specific third-party calendar or email applications, with specific organizations (e.g., companies employing the meeting participants), with specific users and/or be otherwise categorized with respect to metadata that may be associated with a meeting invitation. Such a template may provide the system with additional confidence in identifying portions of text data as meeting agenda topics, action items, and/or other data that the system attempts to parse or extract from meeting invitations and/or emails. The templates may be used in combination with machine learning models to automatically generate regular expressions or other logic for extracting desired text.

The parser 358 may use one or more machine learning models (such as support vector machines, various types of neural networks, naive Bayes classifiers, or others known in the art) to learn patterns, formatting, keywords and/or various other text features that correlate with the presence of text data or file references that may be relevant to custom meeting-related skills or functionalities implemented in accordance with the present disclosure. Text classifiers may be trained specifically for a given skill (such as a skill to identify meeting action items) from input text data (such as text data extracted from meeting invitations and emails). For example, the models or classifiers for a MeetingAgenda skill may be trained in order to identify potential input values for the skill invocation (e.g., identify a text reference to a file name or file nickname in a meeting invitation or email that may later be referring to in a spoken skill invocation like "Display the quarterly results spreadsheet"). As another example with reference to the same skill, other models or classifiers may be trained to identify phrases or portions of input text that likely represent action items to be discussed during the meeting (e.g., to respond to a skill invocation such as "What were we planning to discuss today?") or to be performed by a participant prior to the meeting (e.g., identify that a certain file should be distributed to the meeting participants before the meeting).

In some embodiments, the parsing results with respect to each of a number of functionalities (e.g., a MeetingAgenda functionality, a ParticipantList functionality, a ShowDocument functionality, etc.) may be stored by the parser 358 in a data object or data structure specific to the given functionality. For example, a MeetingAgenda functionality may be associated with an enumerated data type that stores a variable number of individual identified action items or topics depending on what was identified in the input text. The data stored in this manner may then be used by a code module associated with the given functionality to retrieve the relevant determined data based on field names or other discrete labels when the functionality is later invoked (either invoked by a user or internally within the system), such as at block 208 or 210.

As discussed above with respect to FIG. 2, if the parser 358 identifies pre-meeting action items or tasks identified in the input text, the service provider system 350 may proceed to block 206, where the system generates a reminder for the pre-meeting task and either adds the reminder to a calendar of the responsible user or instructs a VA device to present a notification to the responsible user. Alternatively, a reminder may be created within a reminder service or system that may be associated with the service provider system 350 (such as a reminder service that also stores user-created reminders generated based on spoken commands such as "remind me to take out the trash tomorrow night"). In some embodiments, pre-meeting action items may be inferred by the service provider system from contextual meeting information rather than from a reference to the action item or task explicitly appearing in text. For example, the service provider system may identify a list of individuals referenced in an email determined by the service provider system to be associated with the meeting, and then determine that one of those individuals does not appear on the participant list for the meeting. The service provider system may thus infer that the given individual is potentially a missing participant that should be included in the meeting, and the service provider system may accordingly generate a notification to an organizer of the meeting asking whether the organizer wants to add the missing participant to the meeting invitation.

At block 208, the service provider system 350 may cause audible or visual presentation of a meeting agenda generated based on the parsing results above, such as by sending text or generated speech data to one or more VA devices for presentation or playback. Performance of block 208 may be triggered by a user speaking an invocation phrase associated with a MeetingAgenda functionality (e.g., the user speaking "What is the agenda?" at the start of a meeting), or may be triggered internally by the service provider system 350 (such as upon the service provider system 350 determining that the meeting is about to start or that all of the participants have joined). Alternatively, only a portion of the agenda may be presented, such as in response to a spoken request for a single topic to be discussed (e.g., a user speaking "What is the first topic for this call?"). In some embodiments, the service provider system 350 may indicate a goal for the meeting that the parser determined based on contextual analysis of the meeting invitation and optionally associated emails. For example, the service provider system 350 may indicate to the participants that a goal of the meeting is to decide whether to launch a product. The service provider system may have determined or inferred this goal based on the parser's identification of a number of phrases in emails related to the meeting that reference discussion of whether to launch a certain product and that further reference the need for a meeting.

At block 210, the service provider system 350 may provide contextual responses, based on the parsing results, to other voice commands or invoking phrases received during the meeting. For example, as discussed above, a number of different skills or functionalities may be available to a user to be invoked in association with meetings, and each may have an associated invocation phrase and code module stored at the service provider system. The functionalities may further have templates, models or other parsing logic stored at the service provider system in order for the parser to determine values for various contextual meeting information items relevant to any given functionality. When the speech processing module 364 detects one of the functionality's invoking phrases (which may be one or more words), the service provider system may execute the associated code module, which may in turn access certain pre-processed contextual information determined during the parsing block 204 above in order to generate a response to the user's request.

Figure 3:
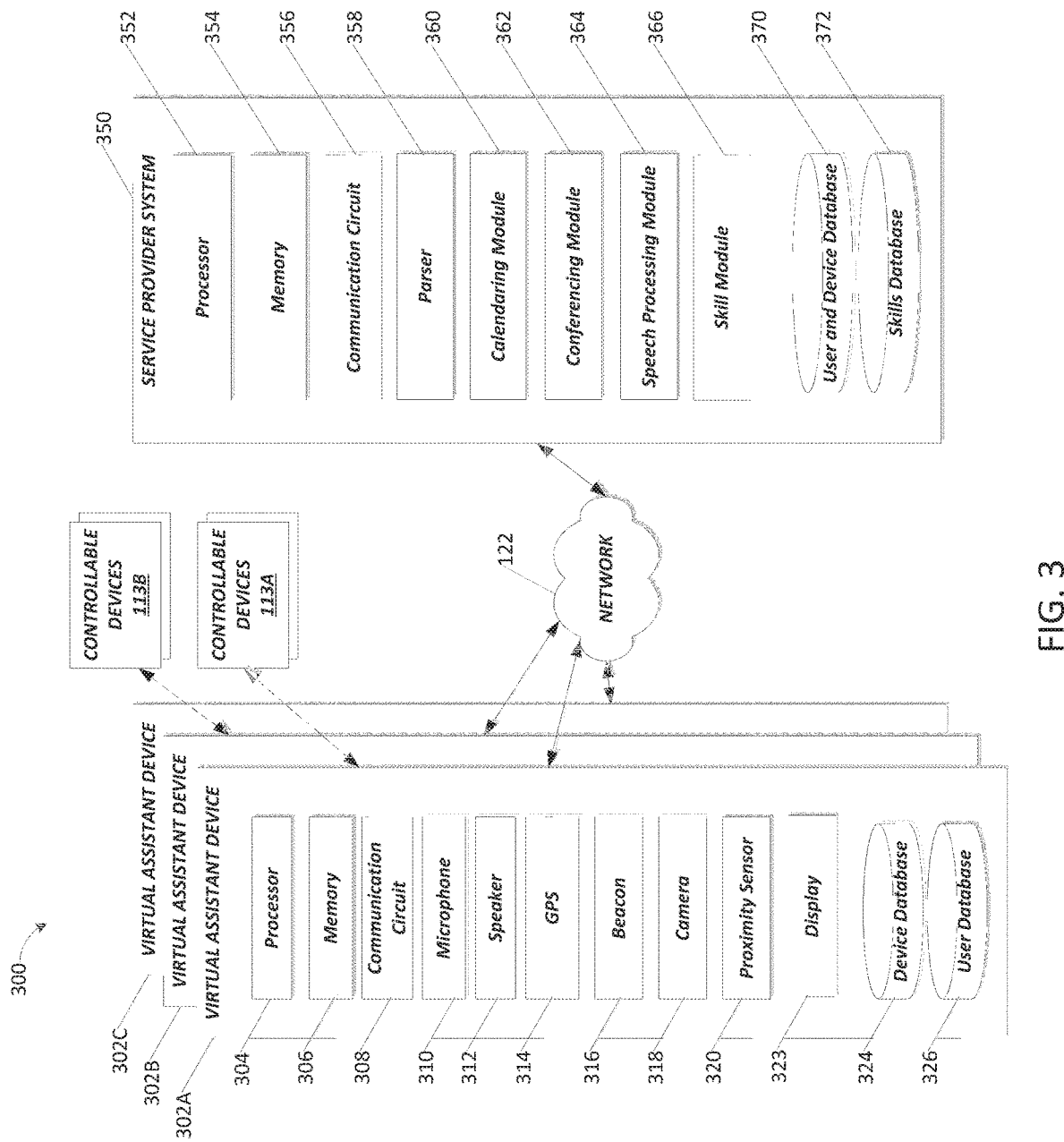
FIG. 3 is an illustrative diagram showing various components of the virtual assistant devices and the service provider system, according to some embodiments.

FIG. 3 is an illustrative diagram showing various components of example VA devices 302A, 302B and 302C, and the service provider system 350. In various embodiments, the VA devices may be heterogeneous or homogeneous in terms of their device type and/or vendor. The VA devices may include various types of electronic devices, digital devices, and/or computing devices. The VA devices may include voice-capturing devices or smart speakers as well as other home automation and/or IoT devices. The general architecture of the VA devices and the service provider system may include an arrangement of computer hardware and software modules used to implement aspects of the present disclosure. Both types of systems may include many more (or fewer) elements than those shown in FIG. 3.

The service provider system 350 includes a processor 352, a memory 354 (e.g., a computer-readable medium), a communication circuit 356, a parser 358, a calendaring module 360, a conferencing module 362, a speech processing module 364, a skill module 366, a user and device database 370, and a skills database 372, all of which may communicate with one another. The processor 352 may communicate to and from the memory 354 to execute one or more of the modules.

The memory 354 may contain computer program instructions (grouped as modules in some embodiments) that the processor 352 may execute in order to implement one or more embodiments described herein. The memory 354 may generally include RAM, ROM and/or other persistent, auxiliary or non-transitory computer-readable media. The memory 354 may store an operating system (not shown) that provides computer program instructions for use by the processor 352 in the general administration and operation of the service provider system 350. The memory 354 may further include computer program instructions and other information for implementing aspects of the present disclosure.

As an example, in one embodiment, the memory 354 may include a speech processing module 364 to analyze received audio signals 140 to extract content and context of user speech utterances 107. In some embodiments, some or all of the modules may have their own dedicated hardware (including their own memory) and interface with the service provider system 350 over a network 122 rather than residing in the service provider system 350. In some embodiments, other modules may be implemented as services. Services in the environment 300 may be implemented according to a service-oriented architecture (SOA) in which services exchange requests and responses to perform complex operations. For example, the speech processing module 364 may be implemented as a service that analyzes and acts upon voice input from the VA devices and returns content and metadata for the analyzed voice input.

In some embodiments, the service provider system 350 may include a communication circuit 356 for connecting to the network 122. The communication circuit 356 may provide connectivity to one or more networks or computing systems, and the processor 352 may receive information and instructions from other computing systems or services via one or more networks. In the example illustrated in FIG. 3, the communication circuit 352 may be in communication with VA devices 302A, 302B and 302C via the network 122, such as the Internet.

In some embodiments, the service provider system 350 may be configured to provide meeting notifications or other reminders to users. The processor 352 may obtain current time information from the service provider system 350 (for example, from an internal clock or a network clock) and make comparisons of the current time and a reminder's trigger time. When the processor 352 determines equality between the two or that a trigger-time has lapsed without triggering any actions in relation to the reminder, the processor 352 may execute reminder-handling routines. In other embodiments, a reminder service external to the service provider system 350 may alert the service provider system when a reminder has been triggered, such as by utilizing a listening protocol or otherwise enabling the service provider system to subscribe to events associated with a given user.

The conferencing module 362 provides time information and content of meetings, which may be determined based on a variety of electronic calendars or meeting invitations associated with various third-party calendaring services or applications. A meeting may have information associated with the meeting, such as time, location, participants (often identified with respect to each participant's unique identifier, such as an e-mail address), and conference call specific information such as phone number, meeting ID, and passcode.

The speech processing module 364 can process audio signals from a VA device to extract content from the audio signals. In some embodiments, the speech processing module 364 may also generate audio signals to deliver to the VA devices 302A, 302B and/or 302C as part of a notification delivery. In some embodiments, the speech processing module 364 may use various algorithms to identify the originating source of an audio signal, which may be a particular user. For example, the speech processing module 364 may use pattern recognition, machine learning models, and/or various voice profiling techniques to identify a specific user's voice and tag the audio signal with that a speaker identifier for that user (speaker ID).

The service provider system 350 may further include user and device database 370 and skills database 372. The user and device database may store, for example, user account data and device data of the voice-enabled and other devices associated with individual user accounts, as well as device-specific component lists and features. The skills database 372 may store, for each of a number of skills or functionalities, identification of intents, code modules, sample utterances, invoking phrases, and associated parsing templates or models. It should be noted that the above descriptions and distinctions of the modules are provided only to facilitate the understanding of this disclosure and should not be interpreted or understood to limit this disclosure to any specific implementation.

The VA devices 302A, 302B and 302C may each include a processor 304, a memory 306 (e.g., a computer-readable medium), a communication circuit 308, one or more of various sensing mechanisms (which may include microphone 310, speaker 312, GPS 314, beacon 316, camera 318, proximity sensor 320, and/or other sensing mechanisms), a speaker 312, a device database 324, and a user database 326. In the illustrated embodiment, the VA device 302A includes a display 323, such as a touchscreen display. Other VA devices may not include a display screen and may provide feedback to the user audibly, via haptic feedback (via one or more haptic feedback mechanisms not illustrated in FIG. 3), and/or as visual feedback via hardware other than a display screen (such as indicator lights, not illustrated in FIG. 3).

The processor 304 may execute various device drivers to operate its one or more components or sensors 310, 314, 316, 318, 320 and/or 322. In some embodiments, the processor 304 may provide some signal processing (such as filtering the received signals to remove anomalies) or provide data processing (such as compression of audio signals to reduce burden on the communication circuit 308 or minimize network usage). In some embodiments, a VA device may include a built-in device controller (not illustrated) that may employ radio frequency, Bluetooth, Zigbee or other wireless communication protocols to control various controllable devices that are external to the VA device, but that would typically be located within the same home, office, building or other location. In other embodiments, a given VA device may not include a device controller, but instead may communicate with an external device controller (such as a smart home hub, smart bridge or gateway, not illustrated) in order to relay device control commands to local controllable devices.

The memory 306 may contain computer program instructions (grouped as modules or modules in some embodiments) that the processor 352 may execute in order to implement one or more embodiments described herein. More specifically, the memory 306 may store an operating system and device drivers for the operation of the sensors. The memory 306 may further include computer program instructions and other information for implementing aspects of the present disclosure. While FIG. 3 shows various possible detection or sensing mechanisms, the specific features provided by a given VA device and its hardware components may vary from device to device. The type and number of sensing mechanisms may vary between VA devices 302A, 302B and 302C, and those illustrated in FIG. 3 are not required in order for a given device to implement at least some aspects of the present disclosure.

In some embodiments, the VA device 302A may include a communication circuit 308 for connecting to the network 122. The communication circuit 308 may provide connectivity to one or more networks or computing systems, and the processor 304 may receive information and instructions from other computing systems or services via one or more networks. In the example illustrated in FIG. 3, the communication circuit 308 of VA device 302A may be in communication with other VA devices 302B and 302C and/or the service provider system 350 via the network 122, such as the Internet. The communication circuit 308 may further provide connectivity to other controllable devices, such as IoT devices, lights, blinds, thermostats and others that may be in the same room or other location as the given VA device. For instance, VA device 302A may, at various times, be in communication with a first set of controllable devices 113A, while VA device 302B may be in communication with a second set of controllable devices 113B.

The microphone 310 detects audio signals. Verbal audio signals may contain content that can be analyzed and extracted by the speech processing module 364 for their content and/or to determine a human speaker's identity. In some embodiments, a speech processing module similar to module 364 may be included in the VA device 302A for local processing of recorded audio data (not illustrated).

The GPS component 314 may be used to determine geographic coordinates of a portable VA device 302A, such as a mobile device. The geopositioning information provided in the form of GPS coordinates of a portable VA device can inform the service provider system 350 of a user's whereabouts. The beacon 316, generally, senses other devices capable of detecting beaconing signals in order for a VA device to identify other nearby devices. Beaconing may broadly be interpreted to include various devices that can respond with recognizable signals, such as via a near-field-communication (NFC) tag or reader circuits.

The camera 318 and/or motion sensor 322 may detect movements that can be used in determining a confidence score that a user is in physical proximity of the given VA device 302A. The VA devices may further employ other sensor types, such as a proximity sensor 320, to detect a user's presence. The proximity sensor 320, which may incorporate motion sensing capabilities, may detect motion near the VA device (such as based on infrared or other input regarding the external environment) or motion of the VA device itself (such as using an accelerometer, not shown in FIG. 3, in an instance where the given VA device is a wearable device). These detections may be used, for instance, to determine which of a number of VA devices associated with a user should present a given notification, such as a request to join a meeting.

The speaker 312 may be used to play audio data received from the service provider system 350 to the user, or to play locally-generated audio data (such as using text-to-speech functionality). The VA device 302A, 302B and 302C may each include a device database 324 and user database 326 that include user-device associations, user-specific preferences and reminders, meetings, etc., and device-specific component lists and features. As previously noted, a sensing device or other device that receives input that is used by the service provider system to make various determinations or generate responsive data does not have to be a VA device. For example, devices other than a VA device may communicate data to a VA device or to the service provider system 350 to be considered by the service provider system for various purposes described herein.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A system comprising:
    a database that stores information identifying at least a first voice-enabled functionality and a second voice-enabled functionality that are each configured to be invoked during any of a plurality of meetings, wherein the database further stores (a) identification of a first invocation phrase and a first code module that are both associated with the first voice-enabled functionality and (b) a second invocation phrase and a second code module that are both associated with the second voice-enabled functionality; and at least one hardware processor in communication with the database, the at least one hardware processor configured to execute computer-executable instructions to:

identify a meeting, wherein the meeting is identified from a calendar entry or a meeting invitation sent to a meeting participant;

extract text data from the calendar entry or the meeting invitation;

identify two or more machine learning models previously trained to determine, from text data, input parameters for respective voice-enabled functionalities identified in the database, wherein the two or more machine learning models include (a) a first machine learning model trained to determine at least one input parameter for the first voice-enabled functionality identified in the database and (b) a second machine learning model trained to determine at least one input parameter for the second voice-enabled functionality;

prior to the meeting and prior to invocation of the first or second voice-enabled functionalities, determine, using respective ones of the two or more machine learning models as applied to the text data extracted from the calendar entry or meeting invitation, contextual meeting information that each of the first code module associated with the first voice-enabled functionality and the second code module associated with the second voice-enabled functionality are configured to receive as input, wherein the contextual meeting information comprises at least one of a discussion topic, an agenda item, or a meeting goal;

store the contextual meeting information, as determined from the text data, as a plurality of labeled fields or variables;

determine, during the meeting, that a voice-capturing device has captured audio data that includes a service-invoking phrase followed by the first invocation phrase that is associated in the database with the first voice-enabled functionality, wherein the service-invoking phrase comprises one or more words indicating that a portion of the audio data following the service-invoking phrase should be interpreted by the system as a request or instruction to the system;

in response to the first invocation phrase being captured in the audio data during the meeting, invoke the first voice-enabled functionality during the meeting by providing at least a portion of the contextual meeting information as input to the first code module associated with the first voice-enabled functionality, wherein the at least a portion of the contextual meeting information provided as input to the first code module is not identified by the system as having been uttered in the audio data, wherein the at least a portion of the contextual meeting information provided as input to the first code module comprises a first labeled field or variable that is identified from among the plurality of labeled fields or variables of the contextual meeting information by matching the first labeled field or variable to a type of a first input slot or argument of the first voice-enabled functionality; and generate, based at least in part on execution of the first code module when provided with the at least a portion of the contextual meeting information as input, a response to the first invocation phrase to be audibly presented by the voice-capturing device.

2. The system of claim 1, wherein the at least one hardware processor is further configured to execute computer-executable instructions to:

identify a list of individuals referenced in a message determined to be associated with the meeting;

determine a missing participant for the meeting, wherein the missing participant is determined based on a comparison of the list of individuals referenced in the message to a set of participants identified in the calendar entry or the meeting invitation; and generate a request to an organizer of the meeting to add the missing participant to the meeting invitation.

3. The system of claim 1, wherein the contextual meeting information is further based on parsed text associated with a prior meeting determined to have a similar subject or participant list as the meeting.

4. The system of claim 1, wherein the discussion topic relates to an electronic document, and wherein the at least one hardware processor is further configured to execute computer-executable instructions to:

retrieve the electronic document from a document database; and in response to identifying the second invocation phrase in the audio data, send the electronic document to the voice-capturing device for display.

5. The system of claim 4, wherein the at least one hardware processor is further configured to execute computer-executable instructions to:

determine which electronic document to retrieve, from among electronic documents in the document database, based on the first labeled field or variable of the contextual meeting information.

6. A computer-implemented method comprising:

as implemented by one or more computing devices configured with specific executable instructions, identifying a meeting, wherein the meeting is identified from a calendar entry or a meeting invitation sent to a meeting participant;

extracting unstructured text data from a body of the calendar entry or the meeting invitation;

identifying two or more machine learning models previously trained to determine, from text data, input parameters for respective voice-enabled functionalities, wherein the two or more machine learning models include (a) a first machine learning model trained to determine at least one input parameter for a first voice-enabled functionality and (b) a second machine learning model trained to determine at least one input parameter for a second voice-enabled functionality;

prior to the meeting and prior to invocation of the first or second voice-enabled functionalities, parsing the unstructured text data to determine contextual meeting information associated with each of the first voice-enabled functionality and the second voice-enabled functionality, wherein the first voice-enabled functionality and the second voice-enabled functionality are each associated in an electronic data store with a respective code module that is configured to receive at least a portion of the contextual meeting information as input;

storing the contextual meeting information, as determined by parsing the unstructured text data, as a plurality of labeled fields or variables;

receiving audio data captured by a voice-capturing device in real time during the meeting;

identifying, in the audio data, for at least a portion of the contextual meeting information, a service-invoking phrase followed by a first invocation phrase that is associated with the first voice-enabled functionality;

in response to the first invocation phrase in the audio data, invoking the first voice-enabled functionality during the meeting by providing at least a portion of the contextual meeting information as input to a first code module associated with the first voice-enabled functionality, wherein the at least a portion of the contextual meeting information provided as input to the first code module is based on the parsing of the unstructured text data extracted from the body of the calendar entry or the meeting invitation without identifying the at least a portion of the contextual meeting information as having been uttered in the audio data, wherein the at least a portion of the contextual meeting information provided as input to the first code module comprises a first labeled field or variable that is identified from among the plurality of labeled fields or variables of the contextual meeting information by matching the first labeled field or variable to a type of a first input slot or argument of the first voice-enabled functionality; and generating, based at least in part on execution of the first code module when provided with the at least a portion of the contextual meeting information as input, a response to the first invocation phrase to be audibly presented by the voice-capturing device.

7. The computer-implemented method of claim 6, wherein the contextual meeting information comprises a discussion topic, an agenda item, or a meeting goal.

8. The computer-implemented method of claim 6, wherein the response is generated by a service provider system and sent to the voice-capturing device over a network.

9. The computer-implemented method of claim 8, wherein the response is sent to the voice-capturing device as text data to be converted to speech by the voice-capturing device.

10. The computer-implemented method of claim 6, further comprising:
identifying an email that has a first text portion in a subject line that matches a second text portion in a subject line of the calendar entry or the meeting invitation; and
determining additional contextual meeting information associated with the meeting based on text parsed from the email.

11. The computer-implemented method of claim 6, wherein the portion of the contextual meeting information is determined based on a keyword identified in the unstructured text data.

12. The computer-implemented method of claim 6, wherein the portion of the contextual meeting information is extracted from the unstructured text data based on a template.

13. The computer-implemented method of claim 6, wherein the contextual meeting information is further based on parsed text associated with a prior meeting determined to have a similar subject or participant list as the meeting.

14. The system of claim 1, wherein the at least one hardware processor is further configured to provide responses to each of a plurality of voice commands with different responsive information determined from the contextual meeting information, wherein each of the plurality of voice commands invokes a different one of a plurality of voice-enabled functionalities.

15. The system of claim 14, wherein a first voice command of the plurality of voice commands is associated with a different template or model than a second voice command of the plurality voice commands.

16. The system of claim 1, wherein the text data comprises unstructured text data.

17. The system of claim 16, wherein at least a portion of the contextual meeting information is determined based on a keyword identified in the unstructured text data.

18. The system of claim 16, wherein the unstructured text data is extracted from one of (a) a body of the calendar entry or (b) a body of the meeting invitation.

19. The computer-implemented method of claim 6, further comprising creating a plurality of tokens from the unstructured text data, wherein the contextual meeting information is determined based at least in part on the plurality of tokens.

* * * * *